Jan. 5, 1943.  D. C. DRILL  2,307,117
METHOD OF CONTINUOUSLY MAKING BATTS, BLANKETS, BLOCKS AND THE LIKE
Filed Feb. 21, 1939  14 Sheets-Sheet 1
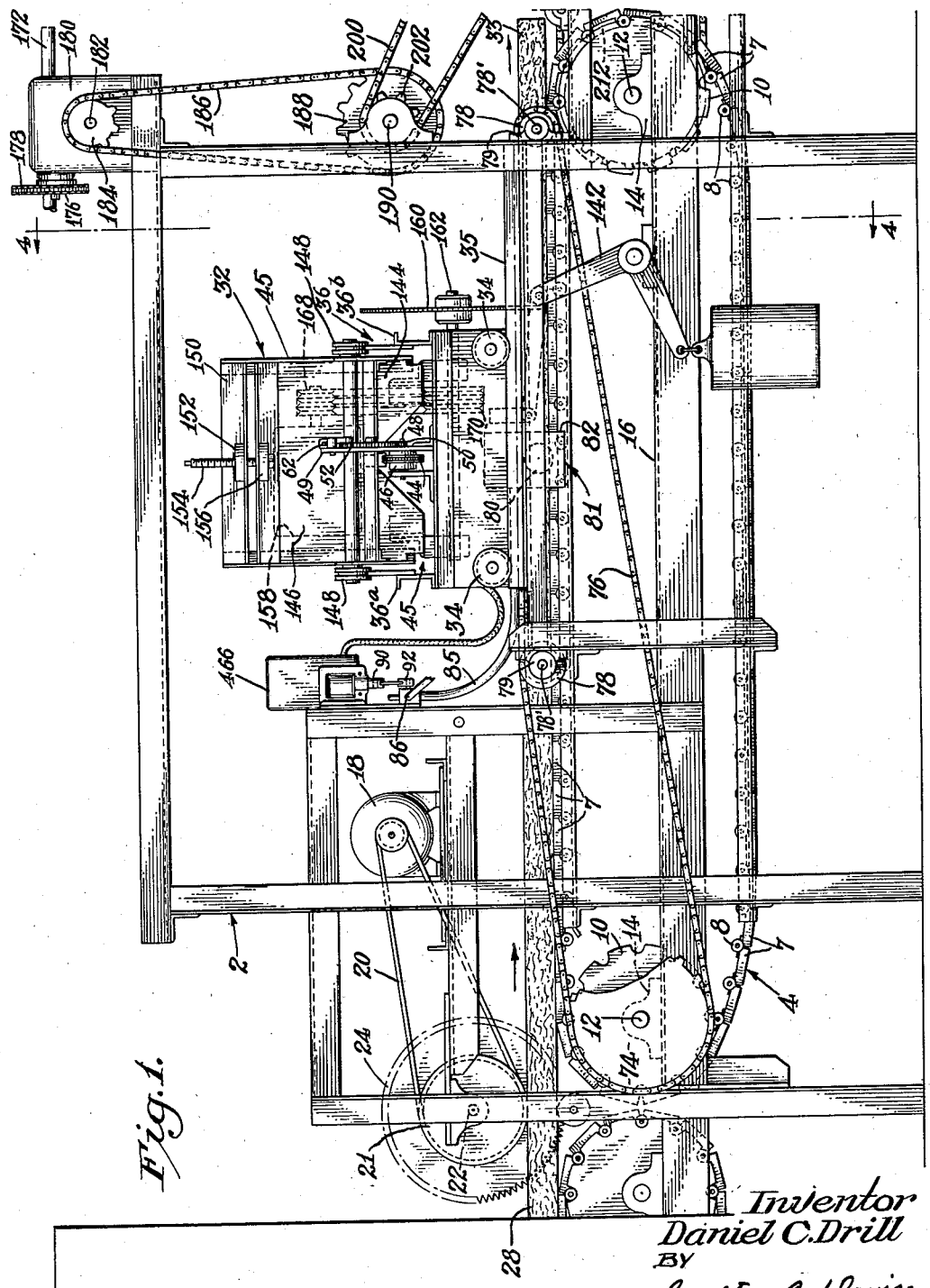
Inventor
Daniel C. Drill
BY
Carlton C. Davis
Attorney.

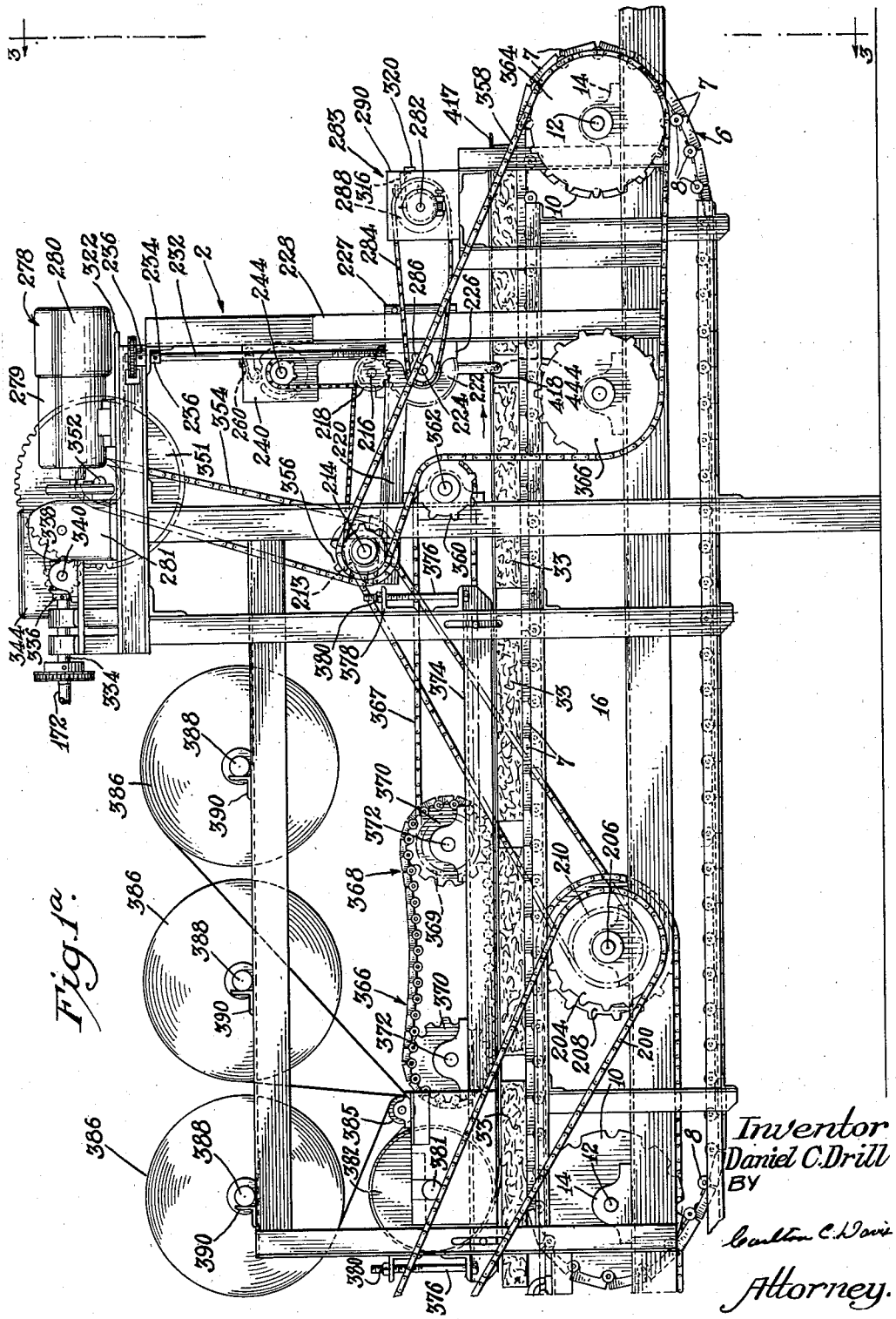

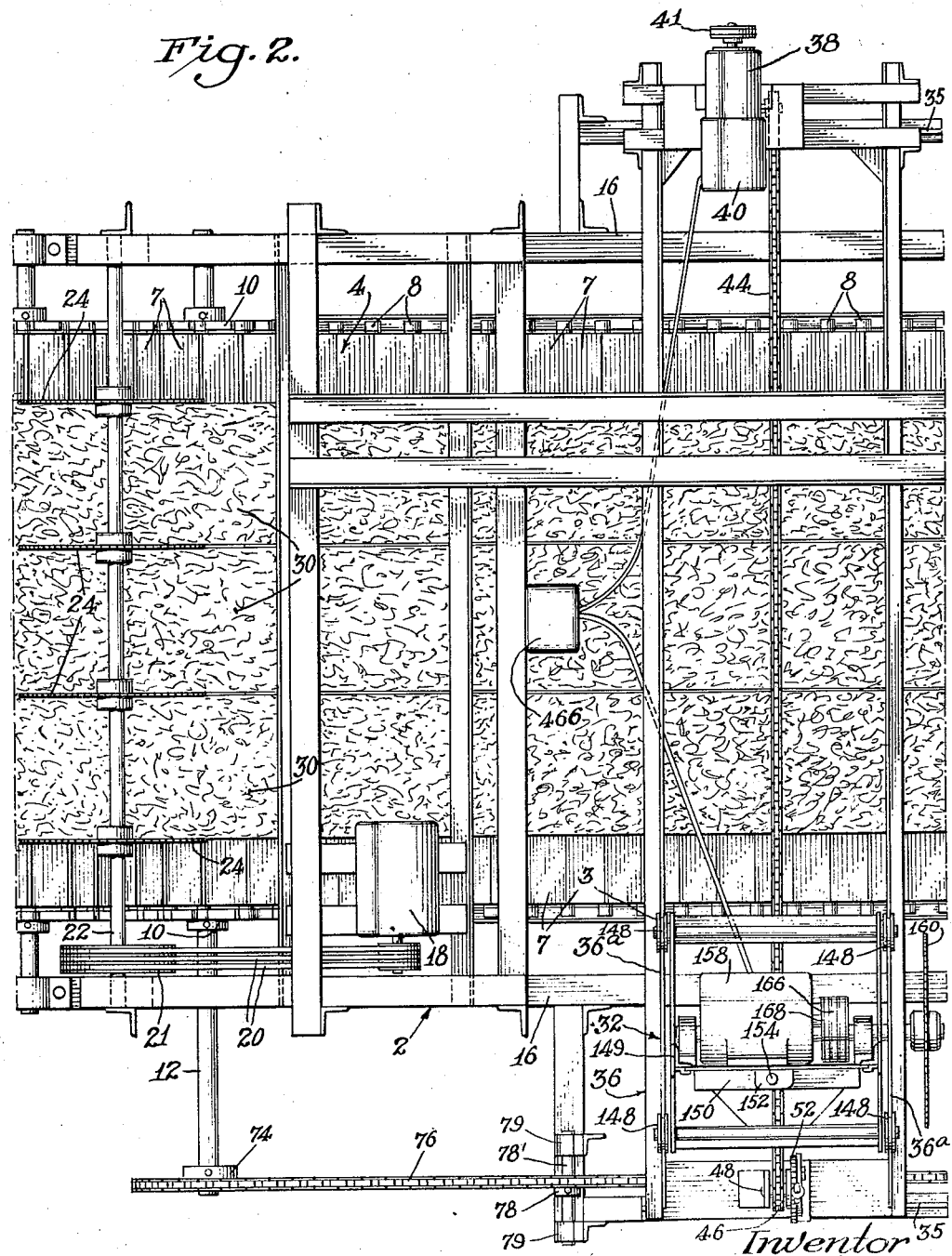

Jan. 5, 1943. D. C. DRILL 2,307,117
METHOD OF CONTINUOUSLY MAKING BATTS, BLANKETS, BLOCKS AND THE LIKE
Filed Feb. 21, 1939 14 Sheets-Sheet 4
Fig. 2ª.
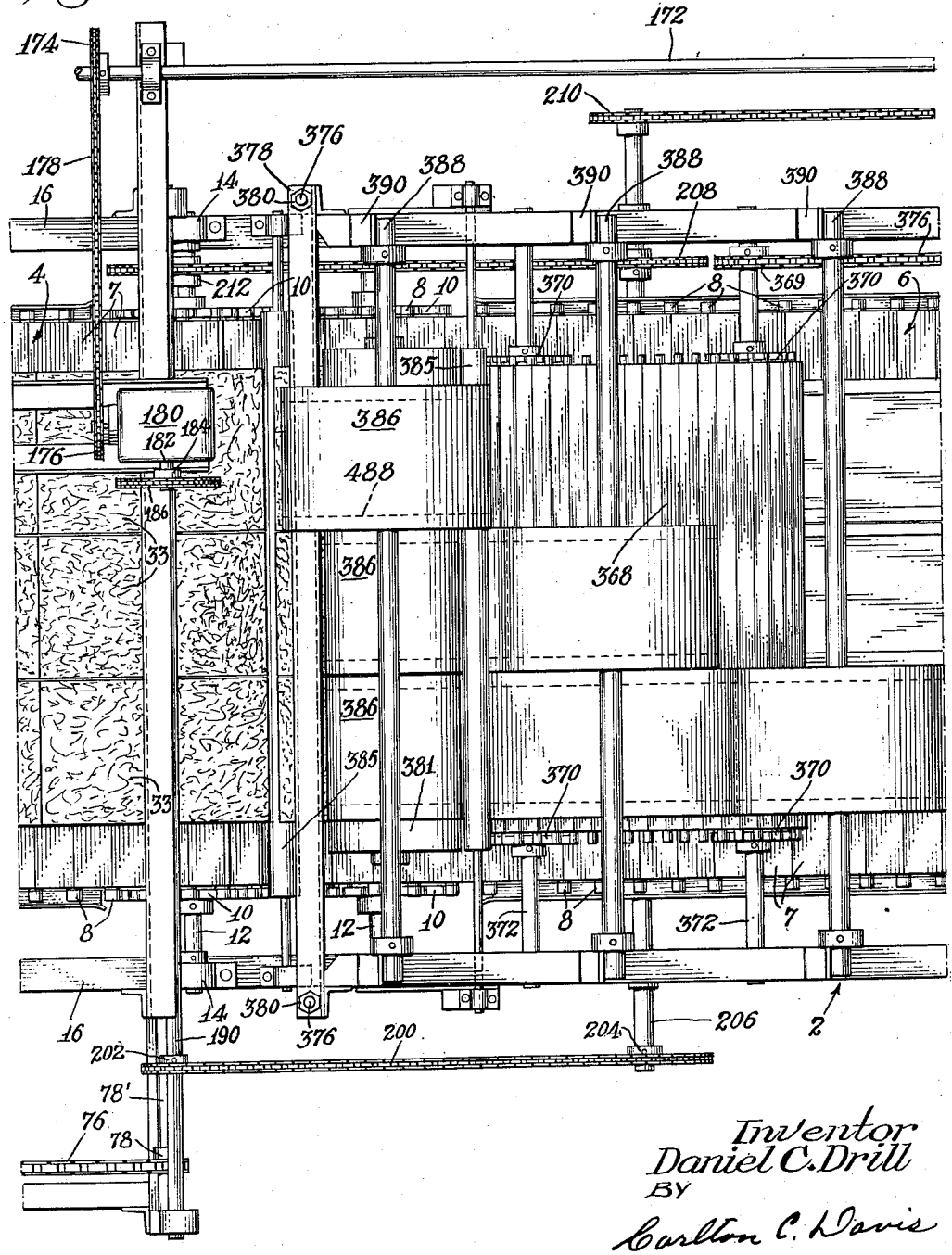
Inventor
Daniel C. Drill
BY
Carlton C. Davis
Attorney.

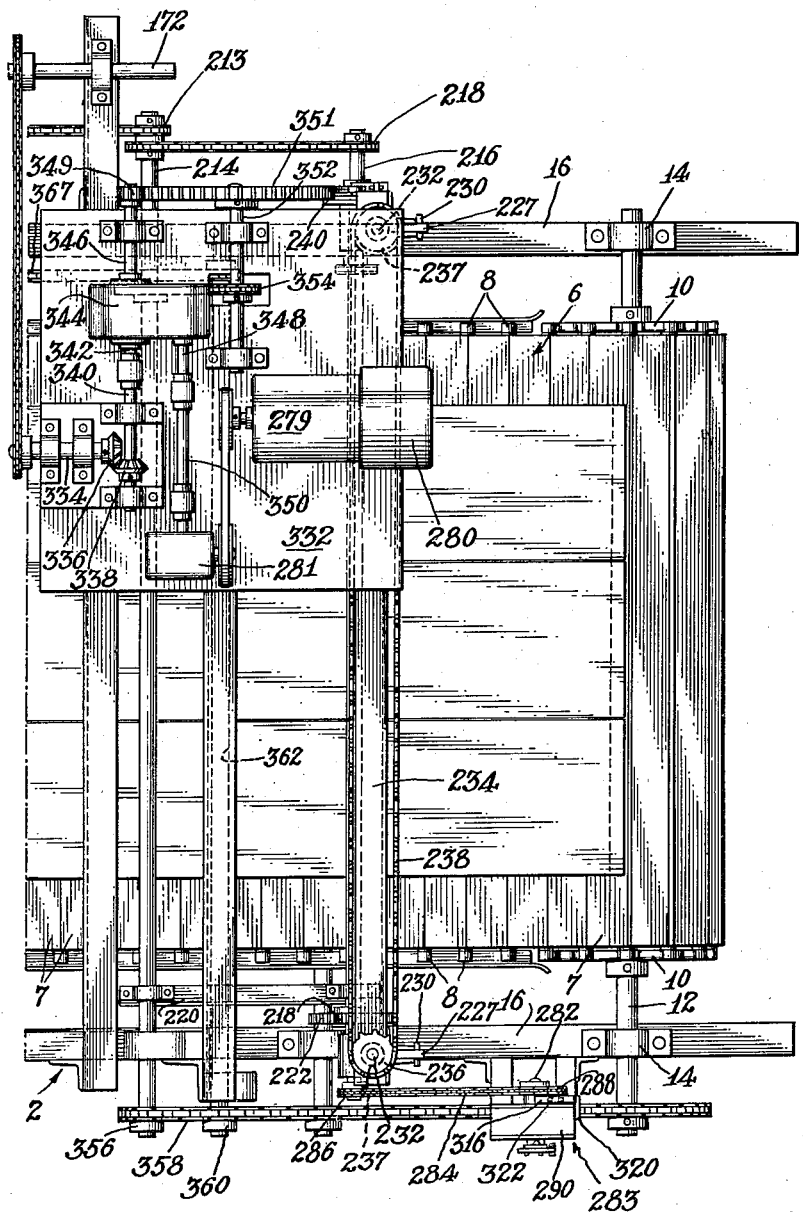
Fig. 2ᵇ.

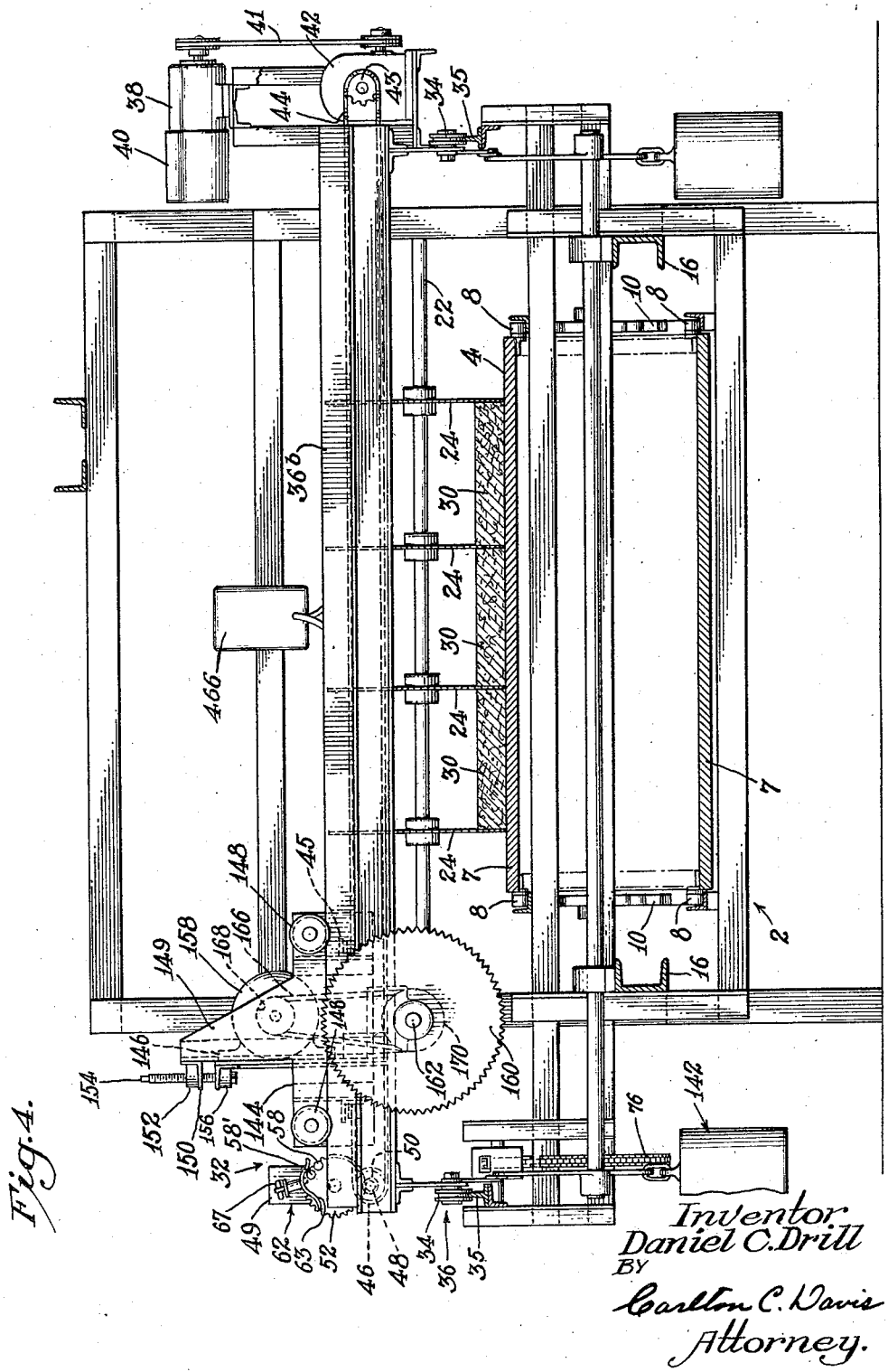

Jan. 5, 1943. D. C. DRILL 2,307,117
METHOD OF CONTINUOUSLY MAKING BATTS, BLANKETS, BLOCKS AND THE LIKE
Filed Feb. 21, 1939 14 Sheets-Sheet 8
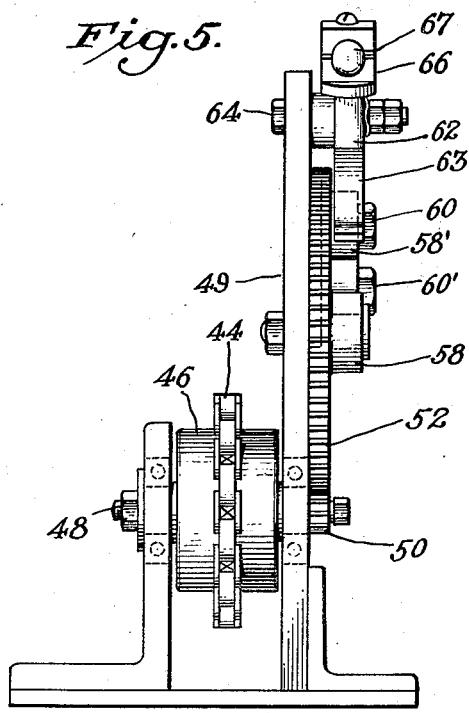
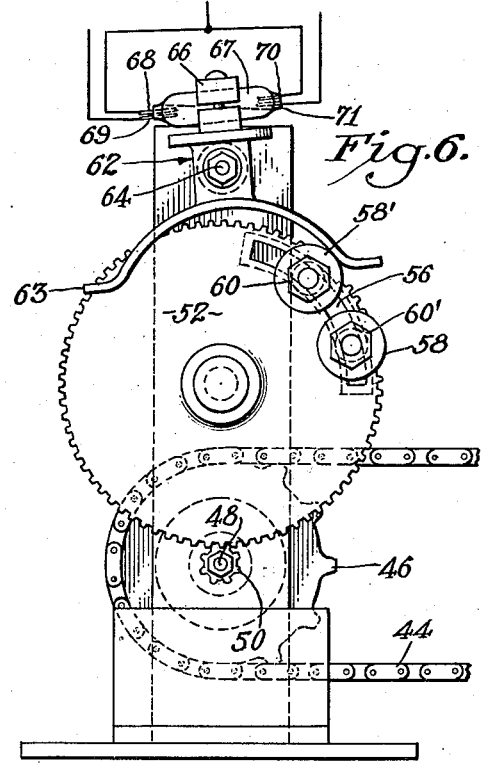
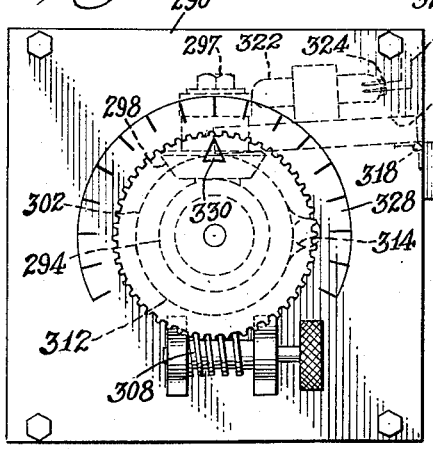
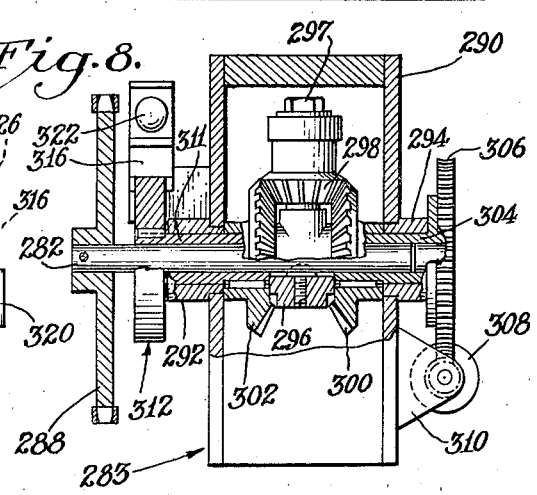
Inventor
Daniel C. Drill
BY
Carlton C. Davis
Attorney.

Jan. 5, 1943.  D. C. DRILL  2,307,117
METHOD OF CONTINUOUSLY MAKING BATTS, BLANKETS, BLOCKS AND THE LIKE
Filed Feb. 21, 1939  14 Sheets-Sheet 9
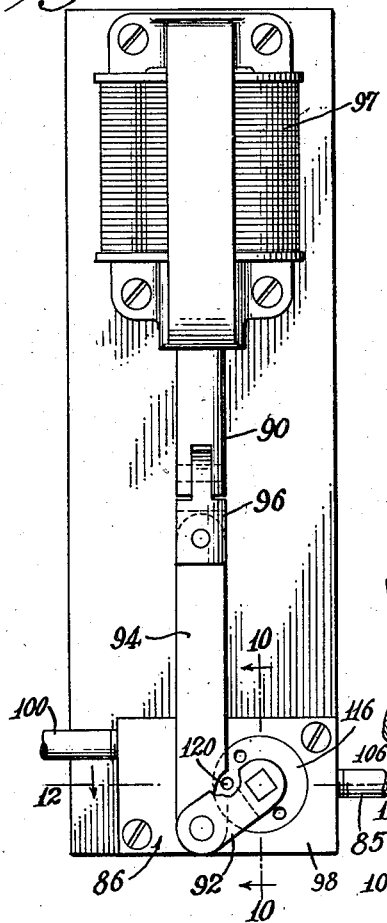
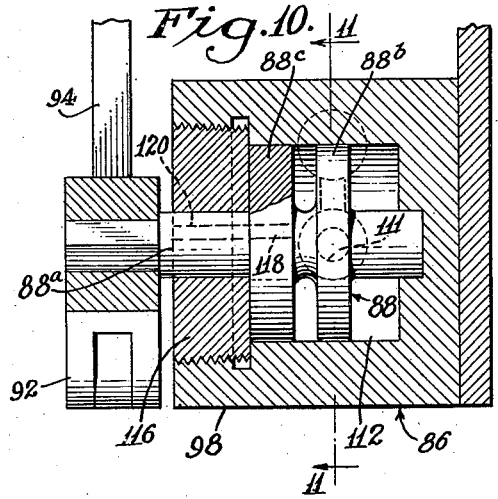
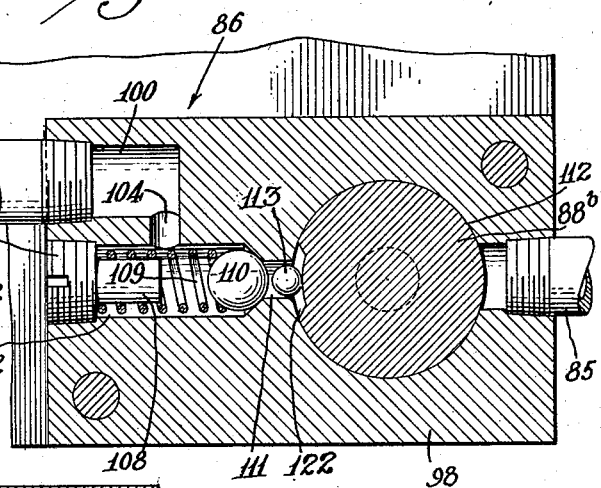
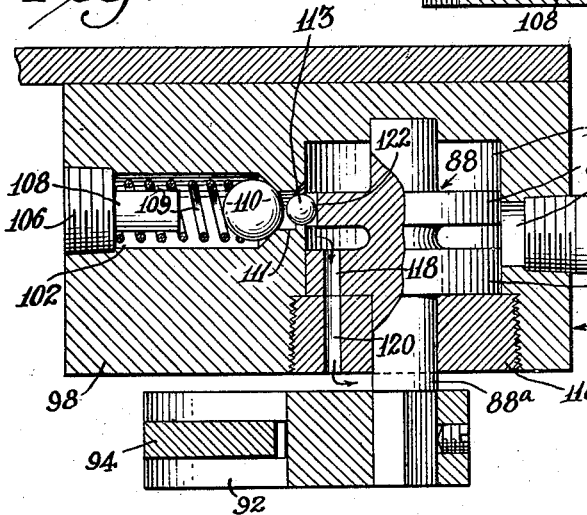
Inventor
Daniel C. Drill
By
Carlton C. Davis
Attorney.

Jan. 5, 1943.     D. C. DRILL     2,307,117
METHOD OF CONTINUOUSLY MAKING BATTS, BLANKETS, BLOCKS AND THE LIKE
Filed Feb. 21, 1939     14 Sheets-Sheet 10
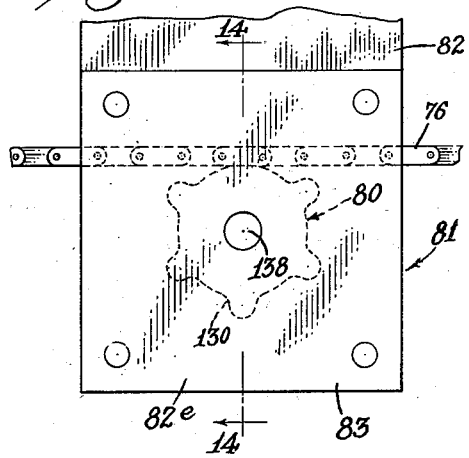
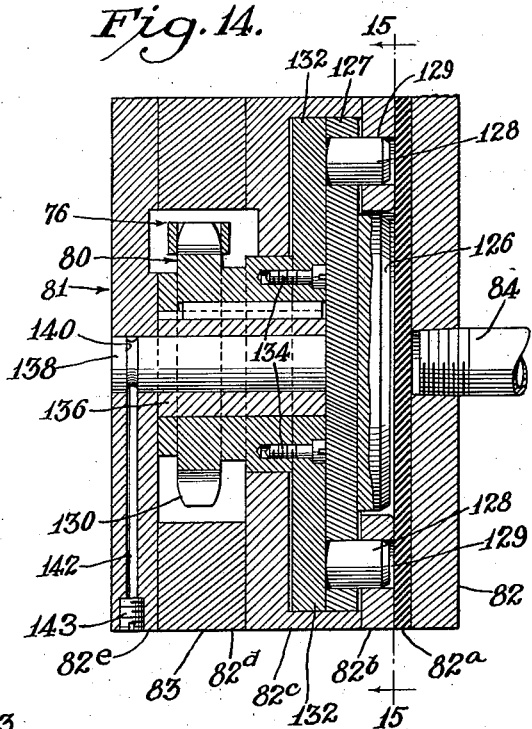
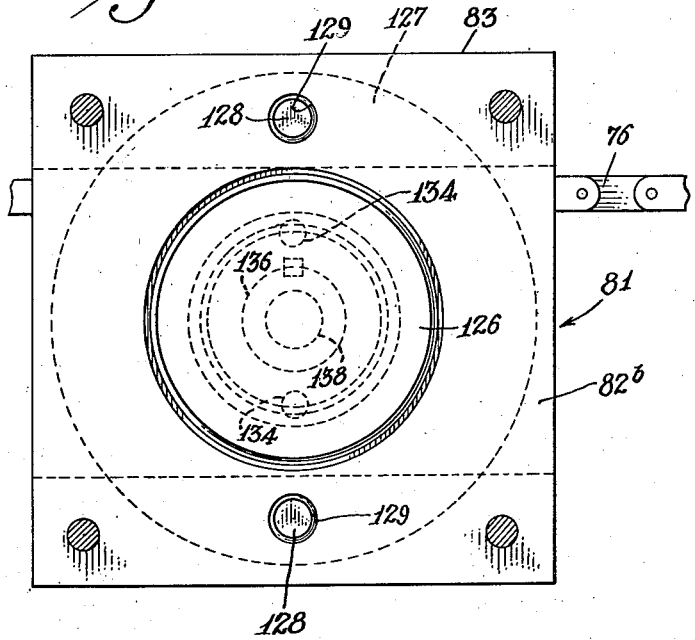
Inventor
Daniel C. Drill
BY
Carlton C. Davis
Attorney.

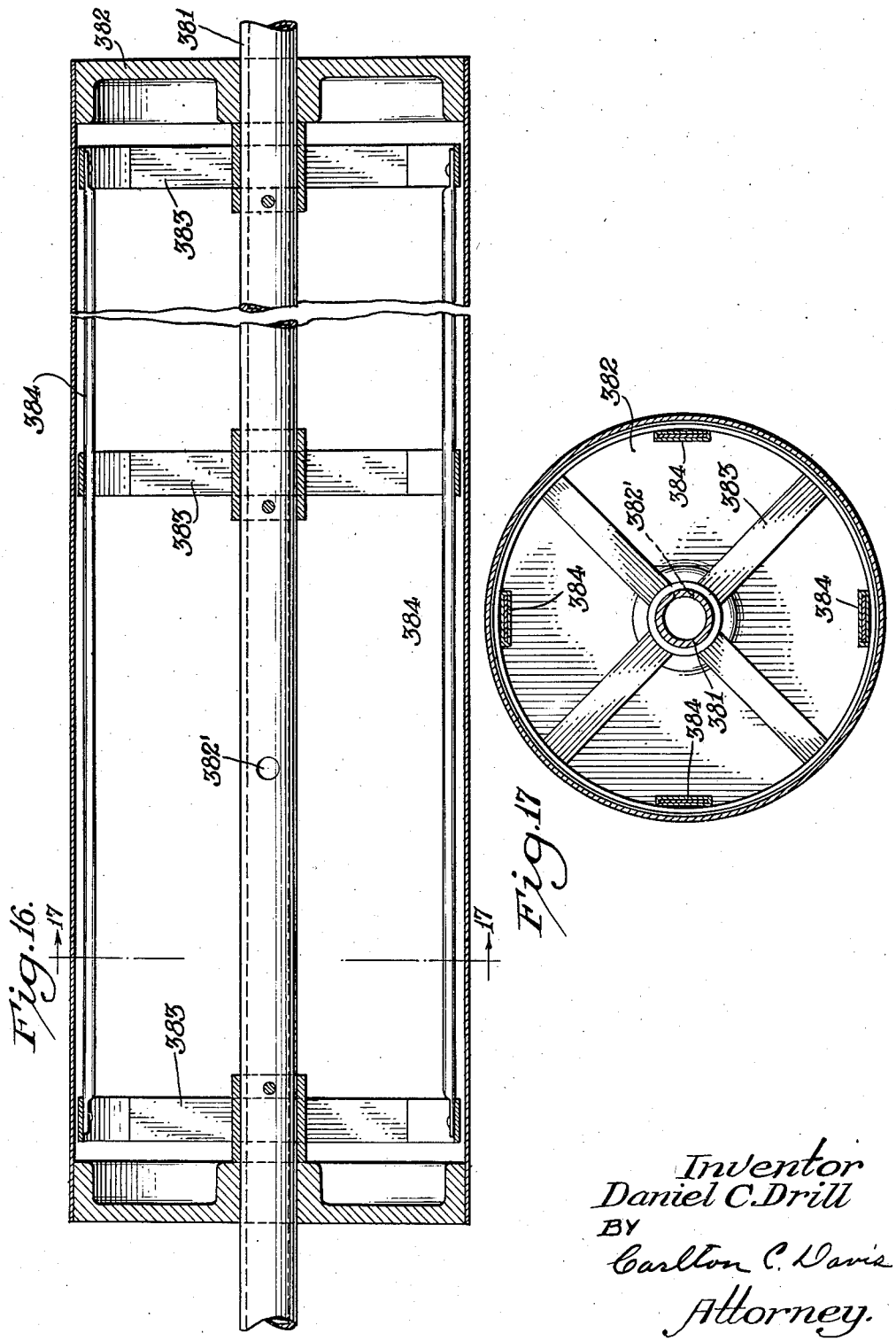

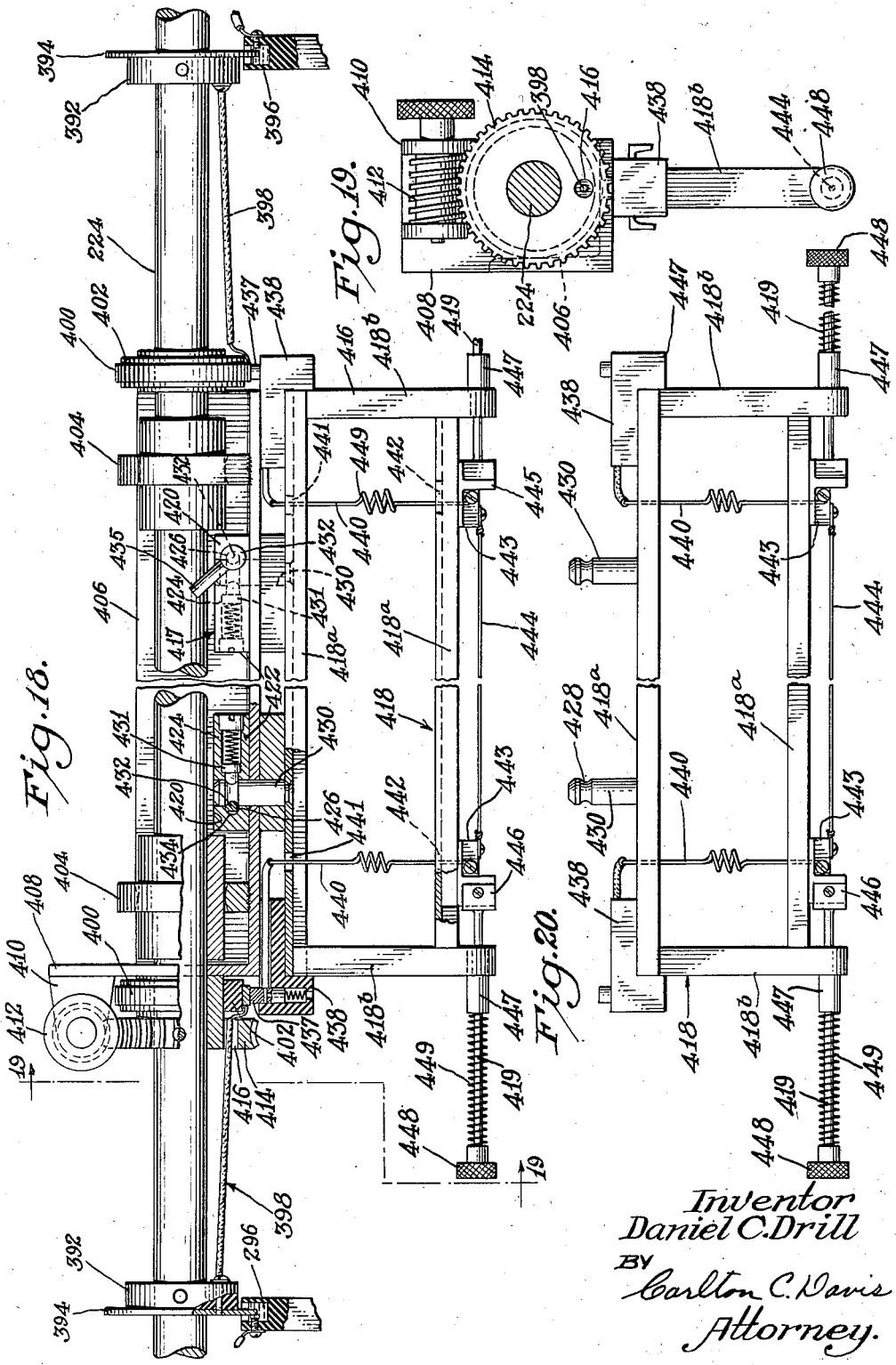

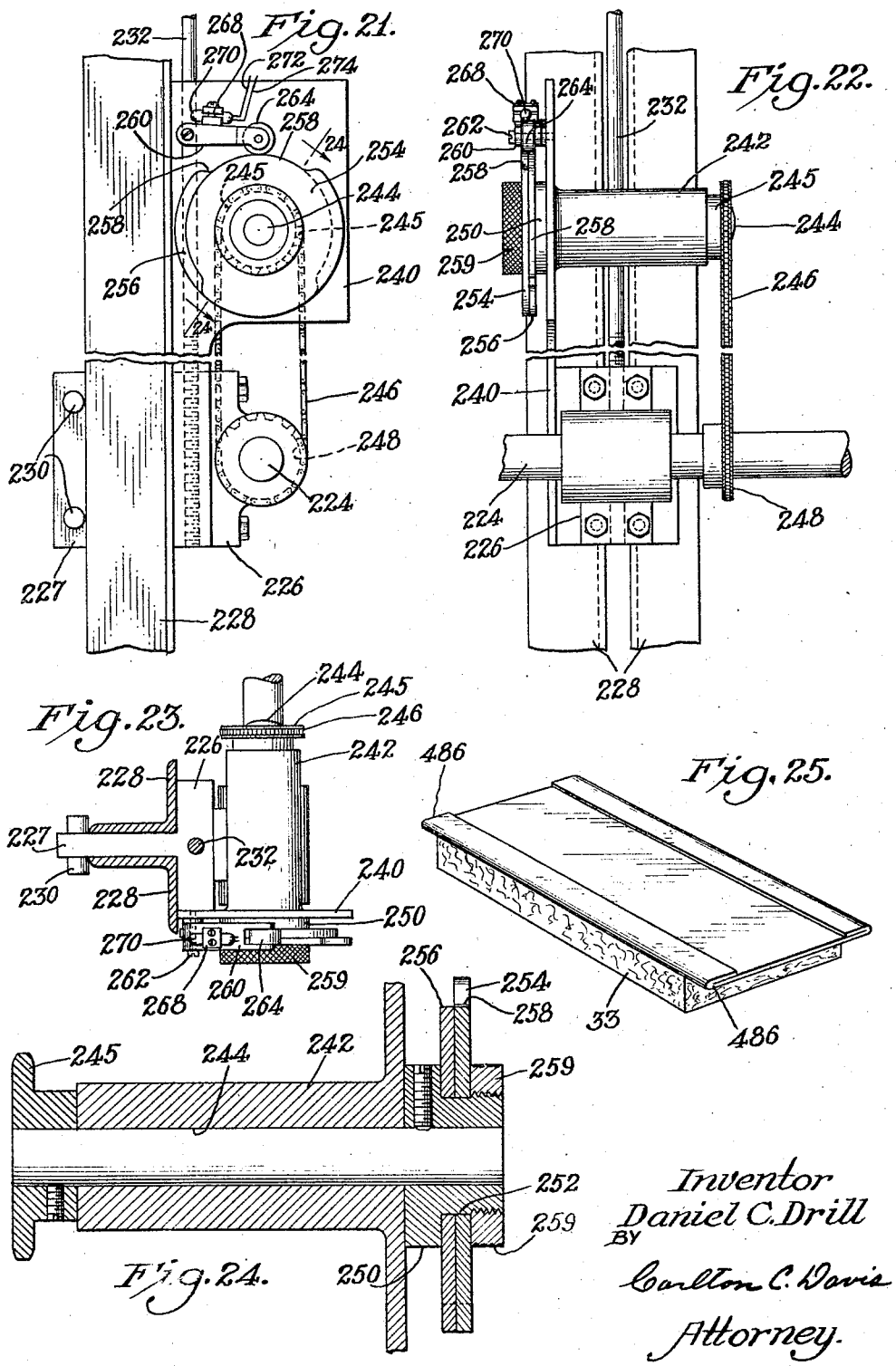

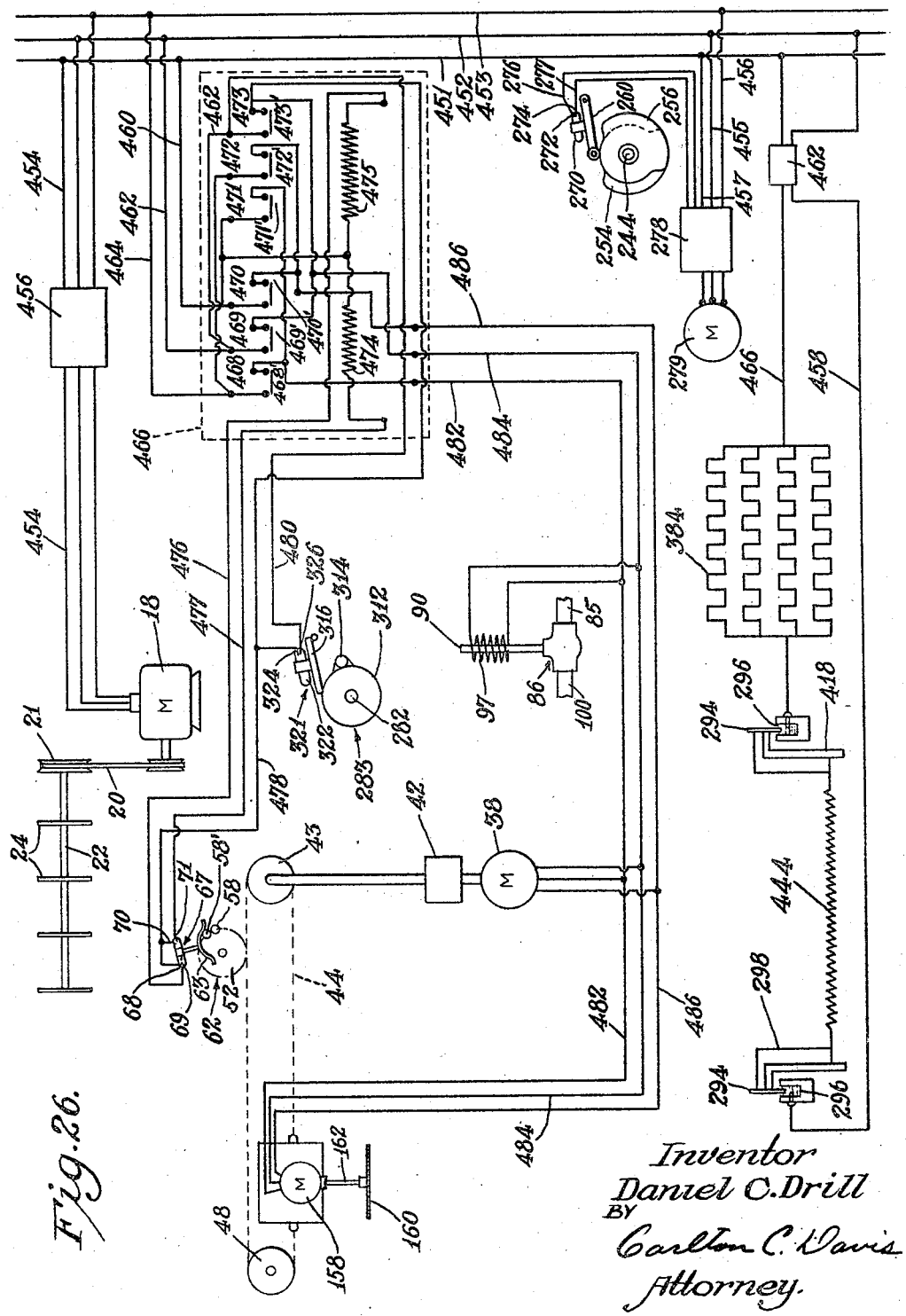

Patented Jan. 5, 1943

2,307,117

UNITED STATES PATENT OFFICE 2,307,117

METHOD OF CONTINUOUSLY MAKING BATTS, BLANKETS, BLOCKS, AND THE LIKE

Daniel C. Drill, Wabash, Ind., assignor to American Rock Wool Corporation, Wabash, Ind., a corporation of Indiana Application February 21, 1939, Serial No. 257,712

6 Claims. (Cl. 154—28)

This invention relates generally to a means for and a method of making batts, blankets, blocks, and the like (hereinafter termed batts) from a relatively long strip of blanket of the material from which the batts are to be formed. This invention also relates to an apparatus for and a method of covering batts with sheets which may extend beyond the edges of the batts to provide means whereby the batts may be secured to each other or to adjacent structural surfaces.

This invention also relates to the continuous production of mineral wool batts and means whereby a covering may be secured to said batts.

As is well known to the art, mineral wool is preferably formed of molten slag, rock, or glass, which is poured in a small stream on a powerful blast of steam or air which shreds the molten material into fibers and blows it into suspension in a large settling chamber provided with a continuously movable floor or conveyor upon which the fibers settle and form a continuous strip which is cut into flat rectangular sections known to the trade as "batts." These mineral wool batts are widely used as industrial and household insulating material. The mineral fibers of these batts are often loosely bonded together by a suitable cementitious material such as rosin or asphalt which is preferably applied to the blast of fiber formation as the blast enters the settling chamber.

Detailed descriptions of very efficient methods of continuously forming the original mineral wool strip from which the batts are cut are given in my United States Patent No. 2,103,769, and in the Drill et al. United States Patent No. 2,124,768. A more detailed description is considered unnecessary to the understanding of this invention, but it is desired to point out that the original blanket or strip is formed continuously in the production and that the fibers of this strip are glass-like, brittle, and fragile, and are ordinarily only slightly cemented together.

It will, therefore, be readily understood that these batts should be handled as little as possible and should be packed in relatively rigid containers directly from the discharge end of the conveyor system in order to make certain that the batts reach the consumer in the best possible condition.

It should also be understood that the trade demands batts of various densities and dimensions and that the same order may specify batts of different sizes. I would also call attention to the fact that certain but not all of the orders require the batts to be provided with sheets or covers, some of which terminate at the edges of the batts and others of which project beyond these edges to provide marginal portions whereby the batts may be secured to each other and adjacent surfaces.

Attention is furthermore directed to the fact that due to high shipping rates, it is almost impossible to ship mineral wool insulating materials long distances and profitably compete with other manufacturers whose plants are located in the vicinity of the ultimate consumer. Due to these conditions, it is considered uneconomical to construct and operate large plants, it being more profitable to operate a number of small plants distributed strategically with reference to the demand than it is to have one or two large plants ship from coast to coast. The machinery of the small plant, however, is necessarily limited and it is highly desirable that a single mineral wool manufacturing unit be adapted to produce the widest possible variety of materials. At the same time it is necessary to be able to provide a substantially complete line of mineral wool products to the dealers for the reason that the dealers prefer to order all their mineral wool supplies from a single manufacturer. Furthermore, as competition increases, the trade insists that its specifications be followed closely and that the densities and dimensions be maintained within close limits and that all orders be filled with the least possible delay.

From the foregoing it is apparent that it is very desirable that a single machine not only be adapted to manufacture a large variety of batts, but it is also desirable that the densities and dimensions be maintained within very close limits and that this be done at the least possible cost and with the least possible handling before the products are packaged.

It is an object of this invention to provide a method for meeting each and all of these exacting demands.

Another object of this invention is to provide a method for separating continuously advancing material into strips, blocks, batts, or other forms having predetermined dimensions and or densities.

Another object is to provide methods for compacting a plurality of continuously advancing and separated forms to the desired thickness.

The other and further objects of this invention will be more fully understood from the following description and from the accompanying drawings.

In the drawings:

Figures 1 and 1A together shown a side elevational view of a machine embodying my invention;

Figures 1 and 1A together show a side eleva-

Figures 2, 2A and 2B together show a top plan view of the machine shown in Figures 1 and 1A;

Figure 3 is a section taken along the lines 3—3 of Figure 1A;

Figure 4 is a section taken along the line 4—4 of Figure 1;

Figure 6 is a front elevational view of the same;

Figure 7 is a front elevational view of a timing mechanism which controls an electrical switch operatively connected to a motor driven variable speed drive means whereby the rear conveyor of the machine may be accelerated in a manner adapted to separate or space the batts cut from the main blanket;

Figure 8 is a partly elevational and partly cross-sectional view of the mechanism shown in Figure 7;

Figure 9 is a longitudinal view of a solenoid operated valve whereby air pressure may be applied to a pneumatically operated means for locking an idler gear to a conveyor chain in such a manner that a transversely cutting saw is advanced with the speed of the front conveyor as it cuts the advancing insulating blanket in a direction at right angles to its direction of travel;

Figure 10 is a section taken along the line 10—10 of Figure 9;

Figure 11 is a section taken along the line 11—11 of Figure 10;

Figure 12 is a section taken along the line 12—12 of Figure 9;

Figure 13 is a side elevational view showing sprocket and disc means whereby a transversely cutting saw mechanism is intermittently advanced with the front conveyor;

Figure 14 is a section taken along the line 14—14 of Figure 13;

Figure 15 is a section taken along the line 15—15 of Figure 14;

Figure 16 is a cross-sectional view of an electrically heated roller which is adapted to heat tarred or asphalted coated paper before it is applied to the batts which have been formed by sawing the advancing blanket of insulating material both longitudinally and cross-sectionally;

Figure 17 is a section taken along the line 17—17 of Figure 16;

Figure 18 is a partly sectional and partly side elevational view of a hot wire mechanism whereby the sheets covering the batts may be burned into sections, each of which is secured to an individual batt;

Figure 19 is a section taken along the line 19—19 of Figure 18;

Figure 20 is a side elevational view of the lower portion of the wire heating mechanism shown in Figure 18. In this figure the hot wire holding portion is detached from the upper portion carrying shaft whereby the hot wire is rotated;

Figure 5:
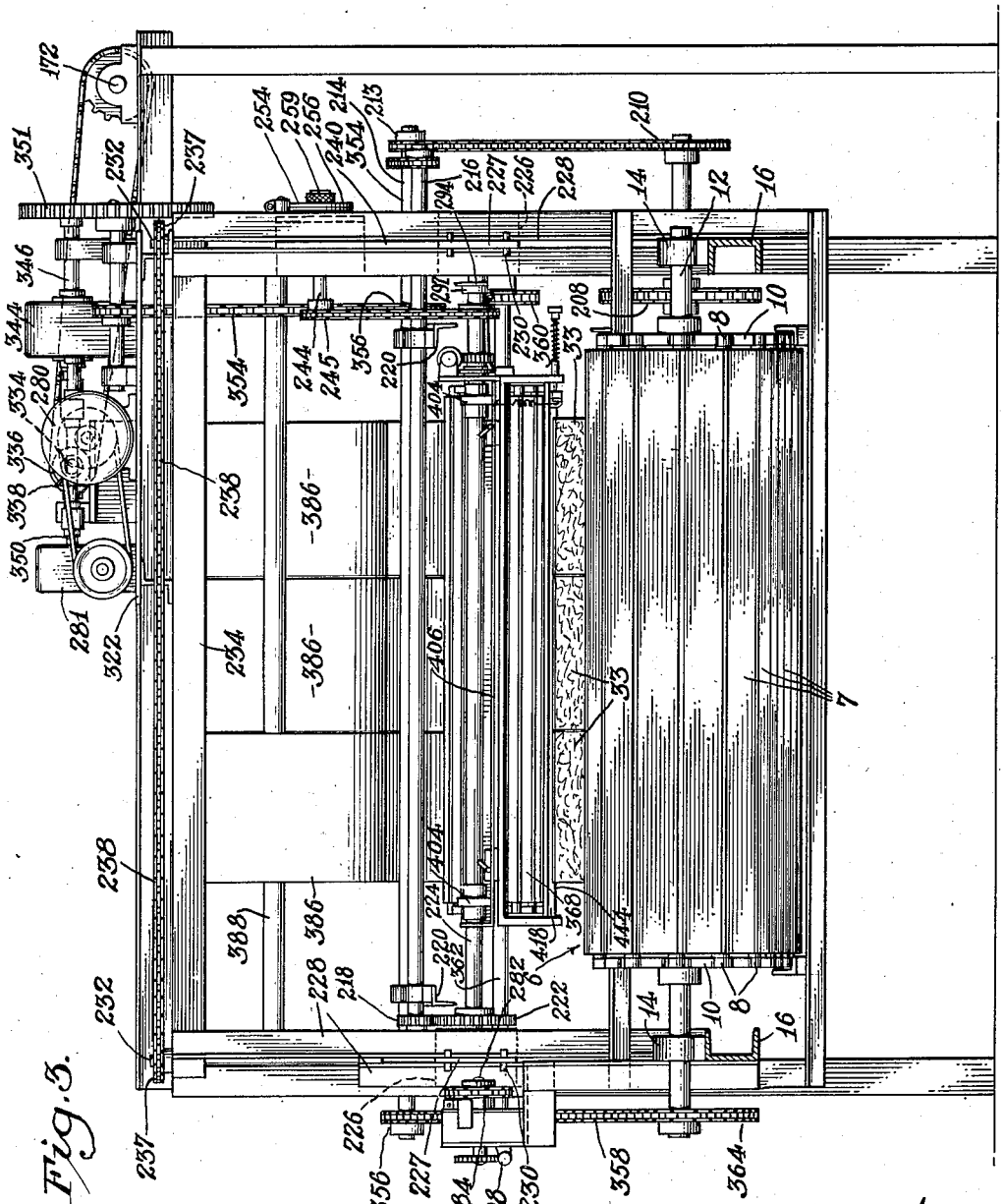
Figure 5 is a side elevational view of an electrical switch mechanism adapted for operating an electrical relay which, in turn, operates devices which control the movement of a saw which cuts an advancing elongated blanket at right angles to the direction of travel of the said blanket.

Figure 21 is a front elevational view showing a mercury electrical switch and an adjustable cam mechanism whereby the operation of the switch may be controlled, said switch being operatively connected to a motor driving to a variable speed drive mechanism. This mechanism is adapted to accelerate the speed of the rear conveyor at predetermined intervals to the end that the batts which are closely spaced together on the front conveyor may be separated at predetermined distances on the rear conveyor;

Figure 22 is a side-elevational view of the mechanism shown in Figure 21;

Figure 23 is a top plan view of the same mechanism;

Figure 24 is a section taken along the line 24—24 of Figure 21;

Figure 25 is a perspective view of a paper covered batt produced by the machine of my invention; and Figure 26 is a diagram showing electrical circuits operatively associated with my improved machine.

The mechanism embodying my invention is shown in the accompanying drawings, in a mineral wool plant aiding in the production of mineral wool batts, but it will, of course, be understood that this mechanism is adapted to be used in other industrial fields wherein advancing sheets or bodies are cut, sawed, or otherwise separated into portions or sections having predetermined dimensions or predetermined densities.

In these drawings, this mechanism is shown having a front conveyor and a rear conveyor and the front conveyor is depicted as receiving a continuously advancing blanket of mineral wool from an adjacent conveyor of a mineral wool settling chamber. As the front conveyor receives this advancing blanket, the blanket is sawed or cut into a plurality of longitudinal strips. As these strips are advanced by the front conveyor they are cut or sawed transversely into predetermined lengths by a saw mechanism which moves a circular saw transversely through these strips, and, at the same time, advances the saw at the same speed the strips are moving forward on said front conveyor. The strips are now cut into rectangular forms which are known to the trade as "mineral wool batts" which are widely used for household and industrial heat insulation purposes.

After the saw has cut across the strips, the saw mechanism is automatically moved rearwardly by springs or weighted levers, and then remains stationary until the strips have advanced sufficiently to be cut into another set of batts. At this time the saw mechanism again moves forwardly and across these strips and saws the strips into a second set of batts. After retraversing these strips, the saw is again moved automatically backward to its original starting position. This cycle is repeated as the strips advance on the front conveyor.

The batts are now passed upon the rear conveyor which moves forwardly at the same speed as the front conveyor except when it is desired to separate these batts from each other to the end that these batts may be provided with sheets which have longitudinally extending marginal projecting portions. In this event, immediately after the rear conveyor receives the advancing batt, the rear conveyor is accelerated sufficiently to move the newly received batts the necessary distance from the immediately following batts.

In Figure 1—A, for the purpose of illustrating the process employed, the mechanism is shown in the act of applying covers having two folded side marginal strips, one forwardly, and one rearwardly extending strip. Let us assume that each of these strips is two inches wide. Now, to properly space this type of batt, the upper portion of the rear conveyor advances four inches ahead of the position it would have traveled had the rear conveyor continued moving at the same speed as the first conveyor. It is, of course, obvious that were only one end strip to be provided that the rear conveyor would be advanced only two inches.

In the accompanying figures, the advancing blanket is shown cut into three parallel strips. In the present instance the rear conveyor portion of the mechanism is, therefore, provided with three paper rolls, each of which is placed above these mineral wool strips and is in alignment with one of the strips. The outer surface of these rolled strips is provided with an adhesive coating, such as resin, asphalt, or tar, which is softened as these strips pass over a heated and freely rotatable drum which (see Fig. 1—A) adheringly deposits and secures the adhesively treated paper strips on the upper surface of each of the advancing batts. These batts now move under an adjustably mounted compacting belt which travels at the same speed as the rear conveyor. This compacting belt compacts the batt to a predetermined thickness. It pulls and unwinds the paper rolls and thereby rotates the drum, which is carried on the rear conveyor, preferably above its front end portion, which receives each advancing batt as it is moved rearwardly on the rear end portion of the front conveyor. As these adhesively treated strips are applied to the upper surface of these batts, it becomes frictionally and adhesively secured thereto and therefore draws these batts rearwardly as the rear conveyor is accelerated at predetermined intervals.

It is therefore apparent that, in the machine shown in the accompanying drawings, these strips not only serve as a covering but also aid the conveyor belt of the rear conveyor in drawing each batt a predetermined distance from the next succeeding batt.

After these strips have moved past the compacting belt the strips on each of the batts are separated by a rotatably mounted electrically heated wire means which burns the strips into sections at the desired positions between the batts. The batts are now moved to a discharge conveyor or platform from which they may be deposited in relatively rigid containers in a horizontal position.

The above described method of producing these batts is very simple, but the means whereby this method has been employed continuously, day after day, with amazing precision, is more complicated, and will, of course, require a detailed description.

Referring now to Figures 1 to 4, inclusive, the mechanism of my invention is provided with any suitable frame 2 which may be formed of a plurality of vertical transversely and longitudinally extending angle bars rigidly connected together. On this frame are mounted, adjacent to and in alignment with each other, a front conveyor 4 and a rear conveyor 6. Each of these conveyors may consist of a plurality of cross-pieces 7 which are hingedly connected together in any suitable manner to provide a pair of link chains 8 which are in meshed relationship with spaced apart sprocket wheels 10. These sprocket wheels are, in turn, rigidly connected to suitable shafts 12 which are rotatably mounted on any suitable bearing 14. These bearings are preferably secured to a longitudinally extending bar 16 of the frame 2. The front portion of the frame 2 also carries a motor 18 which is coupled by any suitable belts 20 and a pulley 21 to a transversely extending shaft 22 which is rotatably secured to the frame in any suitable manner. This shaft 22 carries a plurality of spaced apart saws 24 which are adapted to separate an advancing blanket 28 of mineral wool into a plurality of longitudinally extending strips 30.

A saw mechanism 32 is provided for the purpose of moving both longitudinally and transversely over the front conveyor and transversely sawing the advancing strips 30 into rectangular batts 33. This mechanism is movably supported in any suitable manner, such as by grooved wheels 34, upon a pair of rails 35, one of which is rigidly secured to either side of the frame in any suitable manner. The grooved wheels 34 carry a longitudinally movable and transversely extending track means 36 on which is mounted a motor 38 provided with an electromagnetic brake 40 for the purpose of immediately stopping the motor when its power is shut off. The combination of a motor with an electromagnetic brake is well known to the art and is believed to require no detailed description.

The motor drives by any suitable means, such as, for instance, a belt 41, a speed reducing mechanism 42 which drives through a sprocket wheel 43, a chain 44, each end of which is bolted or otherwise secured to a hereinafter to be described saw carriage 45. The chain is meshed with a sprocket wheel 46 which is mounted on the opposite side of the track means 36 (see Figures 4 and 5). This sprocket wheel 46 is secured to a shaft 48 which passes through a bearing (not shown) in an upright plate 49 and carries a spur gear 50. This spur gear is meshed to a gear wheel 52 which is rotatably mounted on the plate 49 and is provided with a curved slotted portion 56, the longitudinal center line of which is parallel with an adjacent circumferential portion of the gear wheel 52.

Two rollers 58 and 58' are movably and longitudinally secured in this slotted portion by means of bolts 60 and 60'. This arrangement provides means whereby these rollers may be moved within the slot and spaced apart from each other various distances within the slotted portion.

A double throw four-electrode mercury tube switch carrying member 62 is pivotally mounted on the plate 49 by means of a bolt 64 directly above the gear wheel 52. The upper portion of this member is provided with a clamping means 66 whereby a mercury tube 67 is secured substantially at right angles to the longitudinally extending center line of the member 62. At one end this switch tube is provided with a pair of electrodes 68 and 69 which is shorted by the mercury in the tube when the switch is tilted downwardly toward the left, as viewed in Figures 6 and 26. To the opposite end of the switch tube is likewise secured two similar electrodes 70 and 71 which are shorted when the switch tube is tilted to the right as shown in the above mentioned figures. The switch carrying member 62 carries also at its lower portion a curved arm 63 which is adapted to co-act with the rollers 58 and 58' in tilting the mercury in the switch tube from one side to the other side as soon as the saw carriage has completely traversed the conveyor in either direction.

The above mentioned electrodes are preferably connected to the electrical circuits as shown in Figure 26. These electrical circuits will be described in detail after the mechanical description has been completed. It is now thought sufficient to state that the electrical circuits and the mechanical couplings or gear ratios are such that this mercury switch tube is tilted each time the saw carriage has completely traversed the front conveyor in such a manner as to reverse direction of the rotation of the motor 38.

The track means 36 is adapted to be moved forward and backward longitudinally by the following means.

A sprocket wheel 74 of the same diameter as the front sprocket wheel 10 is fixedly secured to the front shaft 12 and is in meshed relationship with a sprocket chain 76. This chain is supported by and is in meshed relationship with idler sprocket wheels 78. These idler sprocket wheels are fixedly secured to shafts 78' rotatably mounted in bearings 79 which are fixedly secured to the frame 2. The sprocket chain 76 drives a rotatably mounted combination friction disc and sprocket wheel 80 (see Figures 1 and 13 to 15, inclusive). The member 80 forms part of a pneumatically operated device 81 whereby the combination friction disc and sprocket wheel member 80 is clampingly secured in fixed relationship to the track means 36 when compressed air is applied to the pneumatically operated device 81, and is free to rotate when no air pressure is supplied to the device 81.

The pneumatically operated device 81 is fixedly secured to the longitudinally movable track means 36 in any suitable manner, such as, for instance, by a plate 82 which is welded or otherwise fixedly attached to the track means 36. This plate preferably forms part of the casing 83 of the device 81 and is provided with an internally threaded nipple 84 which is, in turn, operatively connected to a flexible conduit 85 which is operatively connected to an air valve 86 (see Figure 1 and Figures 9 to 12, inclusive).

The air valve is provided with a rotor 88 adapted to be operated by a solenoid operated plunger 90. This plunger is raised when the solenoid is energized and drops by reason of its own weight when the solenoid circuit is open. The plunger is operatively connected to the rotor 88 by a rotor crank 92, a link rod 94, and a coupling 96 in such a manner that when the plunger is raised by the action of the solenoid 97, the air is passed through the air valve 86, and when the plunger is lowered, the valve is closed and the compressed air in both the valve and in the device 81 is permitted to escape through hereinafter described exhaust openings 118 and 120 provided in the air valve (see Figure 12).

The air valve is provided with a casing 98 having an inlet conduit 100, a tubular valve chamber 102 and a passageway 104 through which the air passes from the inlet conduit to the valve chamber. The outer end of the valve chamber is threadedly adapted to receive a threaded plug 106 having a short reduced inner end portion 108 which is provided for the purpose of securing a helical spring 109 against a ball 110. The valve chamber 102 is tapered near its inner end to provide a snugly fitting seat for the ball 110 in such a manner that the ball 110 closes the valve as it is pressed against its seat.

The extreme inner end portion 111 of the valve chamber communicates with a cylindrical recessed portion 112 which is adapted to snugly and rotatably receive the valve rotor 88. The inner end portion 111 is provided with a ball of appreciably smaller diameter than the diameter of this inner end portion. This ball is provided for the purpose of permitting the air to flow through the inner end portion when the large ball 110 is pushed out of its seat by the ball 113 in a manner which will be understood as the specification proceeds.

The air valve rotor 88 includes a shaft portion 88a, an inner disc portion 88b, and an outer disc portion 88c. The rotor is secured in position in the casing 98 by means of a threaded plug 116. The inner disc portion is spaced apart from the inner end of the recessed portion 112 to the end that the compressed air in the valve may force the outer disc portion 88c tightly against the threaded plug and prevent the air from escaping from the valve through exhaust openings 118 and 120 provided in the outer disc and in the plug 116 respectively, except when these openings are in alignment with each other, at which time the valve is in its closed position. The inner disc portion 88b at its circumference is provided with a recessed portion 122 in such a manner as to permit the small ball 113 to remain out of contact with the large ball 110 when the valve is closed. When the valve is open, however, the small ball is forced by the rotation of the rotor out of the recessed portion 122 and is pushed against the large ball 110 sufficiently to raise this larger ball and permit the air to freely flow into the portion containing the rotor 88 and pass out of the valve through its air outlet conduit 125 and its nipple 124 which is operatively connected through the flexible conduit 85 to the pneumatically operated device 81.

At this time the device 81 locks this combination disc and sprocket wheel means 80 and prevents its rotation, thereby causing the sprocket chain 76 to move the track means 36 forwardly. This arrangement is provided to the end that the strips may be cut transversely into rectangular batts without at any time stopping the front conveyor. Without this or an equivalent arrangement, the saw would tend to cut the strips diagonally and would also retard the advance of the blanket.

The casing 83 of the device 81 may be made of any suitable construction, but in the form shown, this casing includes the plate 82, a rubber diaphragm 82a, and a plurality of plates 82b, 82c, 82d, and 82e. The above mentioned plates and the rubber diaphragm are fixedly secured together by any suitable means, such as, for instance, by bolts, not shown. The plates 82b, 82c, 84d, and 82e are recessed in a manner adapted to rotatably receive the combined friction disc sprocket wheel 80 and slidably receive two piston plates 126 and 127, which may be, if desired, fixedly secured together in any suitable manner, such as, for instance, by welding. These piston plates 126 and 127 are locked against rotation by pins 128 which project into openings 129 provided in the adjacent portion of the plate 82b.

The combination sprocket wheel and disc member 80 may, if desired, be integrally formed, but in the embodiment shown this member consists of a sprocket wheel portion 130 and a disc portion 132 detachably secured together by screws 134. The sprocket wheel and disc member 80 is rotatably mounted on a bushing 136 and a shaft 138. The shaft 138 is preferably provided with a circumferential lubricating groove 140. The lubricant is preferably applied with any suitable grease gun through the threaded opening 142 which is normally closed by a threaded plug 143. As will be readily understood by referring to Figures 13 to 15, inclusive, the wheel member 80 is frictionally locked in a non-rotatable manner by the compressed air when the air valve is opened.

The compressed air, of course, forces the rubber diaphragm 82—a inwardly in such a manner as to press the disc plate 127 tightly against the disc portion 132 of the disc and the cog wheel member 80 and thereby lock the member and move the track means 36 at the same speed as the front conveyor. As the air valve is closed, the exhaust opening 118 moves in alignment with the air exhaust opening 120 in the threaded plug 116. As the air escapes through these openings, the reduction of the air pressure exerted against the rubber diaphragm 82 permits the friction and cog wheel member 80 to rotate freely.

From the above it is apparent that the track means 36 is advanced when the solenoid 97 of the plunger 90 is electrically energized and that the track means is free to move independently of the sprocket chain 76 when the solenoid circuit is broken. By referring to Figure 1, it will be seen that the track means 36 is provided with a weighted lever means 142 whereby the track means is moved backward to its starting position when the air valve is closed.

The saw carriage 45 (see Figure 4) is provided with a lower stationary frame portion 144 and an upper frame portion 146. The lower frame portion is movably supported in any suitable manner, such as by grooved wheels 148 on rails 36a and 36b carried by the longitudinally movable track means 36. The lower frame portion is provided with preferably integrally formed upright plates 149, and a transversely extending L-shaped beam 150 is welded or otherwise secured to the upper portion of the plates 149, substantially as shown. This bracket carries an internally threaded nut 152 which is adapted to threadedly receive a screw 154 which is operatively connected to a similar bolt 156 which is secured to the upper frame portion 146. The screw 154 provides means whereby the upper frame may be raised or lowered as adjustment is necessary when saws of different diameters are used, or when a saw wears down through use.

The upper frame carries a motor 158 and a saw 160. The saw is mounted on a shaft 162 which is rotatably carried in any suitable bearings which is welded or otherwise secured to the lower end of the upper stationary frame portion. The motor 158 and the shaft 162 are operatively connected together by any suitable means, such as, for instance, a belt 166 and pulleys 168 and 170.

Referring now to Figures 1 to 2b, inclusive, the front and the rear conveyors are operatively connected to a power line shaft 172. This power line shaft drives the front conveyor continuously while the machine is in operation and drives the rear conveyor continuously by itself as long as the rear conveyor moves at the same speed as the front conveyor.

The rear conveyor, however, is speeded up for the purposes and in a manner which will be understood as the specification proceeds.

The power for driving the front conveyor is transmitted from the line drive shaft through sprocket wheels 174 and 176 and a chain belt 178 to the drive shaft of a speed reducer 180. The output shaft 182 of the speed reducer is provided with a sprocket wheel 184 which is operatively connected by a chain belt 186 to a second sprocket wheel 188 secured to a shaft 190.

The shaft 190 drives the shaft 206 through a chain 200 and sprocket wheels 202 and 204. To this shaft are rigidly secured sprocket wheels 208 and 210. The sprocket wheel 208 drives a sprocket wheel 212 which is rigidly secured to the rear one of the shafts 12. The shaft 12 drives the front conveyor through sprocket wheels 10 in mesh with the front conveyor link chain belts 8.

The sprocket wheel 210 on shaft 206 drives a double sprocket idler member 213 which is rotatably mounted on a shaft 214. The double idler sprocket member 212 drives a shaft 216 to which is rigidly secured a gear wheel 218. The shaft 214 is rotatably secured to the frame 2 in any suitable manner and pivotally supports a bar 220 on which the shaft 216 is rotatably mounted. The mounting of the shaft 216 on the free end of this pivotally attached bar provides means whereby this shaft may be lifted and a gear wheel having a larger or smaller number of teeth substituted for the gear wheel 218 mounted on the shaft 216. This arrangement is provided in order that different drive ratios may be obtained from the shaft 216.

The gear wheel 218 (or any other gear wheel substituted therefor) is in meshed relationship with a gear wheel 222 which is rigidly secured to a hot wire carrying shaft 224. The shaft 224 (see Figures 18 to 20, inclusive) is carried at either end by a bearing block 226 to which is welded or otherwise secured a rearwardly extending plate 227. This plate is slidably secured between two upright angle bars 228 secured to the frame 2, and the plate is prevented from moving horizontally by pins 230 substantially as shown. Each of these bearing blocks is provided with a vertically threaded opening which passes entirely through these blocks and is adapted to receive an adjusting rod 232. These rods are threaded at their lower ends in a manner whereby the blocks may be raised or lowered by turning these rods in a clockwise or counter-clockwise direction.

The upper ends of these rods pass through a horizontally extending bar or bracket 234 which is secured to the upper portion of the frame 2. These rods are secured against vertical movement by any suitable means, such as, for instance, by rigidly secured collars 236 which are attached to the rods on either side of the bar 234. The upper end portions of these rods each carries a rigidly secured sprocket wheel 237 which is operatively connected to a chain belt 238. The bearing blocks 226 are simultaneously raised or lowered by merely moving the chain to the right or to the left as viewed in Figure 3.

One of these bearing blocks 226 has a rigidly secured upwardly extending plate 240 (see Figures 21 to 24, inclusive). To the plate 240 is welded or otherwise secured a bearing 242 in which is mounted a shaft 244. One end of this shaft 244 carries a rigidly secured sprocket wheel 245 which is operatively connected to the hot wire carrying shaft 224 by means of a chain belt 246 and a sprocket wheel 248.

The opposite end of the shaft 244 carries a rigidly secured collar 250 having a cylindrical reduced portion 252.

Mounted on this reduced portion 252 are two cam discs 254 and 256 each of which has a circumferential recessed portion 258 preferably extending approximately 180° around the outer edge of these discs. The reduced portion 252 is threaded at its outer end and adapted to receive an adjusting nut 259 whereby the angular position of either of the cam discs about the shaft 224 may be changed as desired. A lever bar 260 is pivotally connected to the plate 240 by any suitable means, such as, for instance, by a bolt 262, and the free end of the lever is preferably provided with a roller 264 which rides upon the cam disc substantially as shown.

Rigidly secured to the upper portion of this lever is a clamping means 268 whereby a mercury tube 270 is clampingly secured to the lever in such a manner that the longitudinal center line of the lever and the tube are parallel with each other.

The end of this tube 270 adjacent to the roller 264 is provided with two electrodes 272 and 274. The electrodes are connected by conductors (see Figure 26) 276 and 277 to the solenoid (not shown) of any suitable plunger operated starter 278 whereby the electrical circuit of a motor 279 is closed when the solenoid is energized and is opened when the solenoid circuit is opened. The construction of starters of this type is well known to the art, and, therefore, requires no detailed description.

The motor 279 is preferably provided with a magnetic brake 280, not shown in Figure 26, of any suitable construction of the type whereby the brake is applied in a spring pressed manner when the circuit of the motor and the brake is opened.

The hot wire carrying shaft 224 is operatively connected to the drive shaft 282 of a master switch means 283 by a chain belt 284 and sprocket wheels 286 and 288 (see Figures 1a, 7 and 8).

The master switch means 283 is mounted on a casing 290 which is rigidly secured to the frame 2 in any suitable manner. The casing 290 is provided with two aligned and spaced-apart bearings 292 and 294 which pass through opposite sides of the casings. The shaft 282 preferably passes through these bearings substantially as shown. In the central portion of the casing 290 a collar means 296 is rigidly secured to the shaft. This collar means is threadedly adapted to receive a stud shaft or bolt 297 around which a bevel pinion 298 is rotatably mounted. This bevel pinion is in meshed relation with bevel gears 300 and 302 which are rotatably mounted on the shaft 282 on opposite sides of the pinion.

The bevel gear 300 is keyed to a sleeve 304 which is, in turn, keyed to the shaft 282. The sleeve 304 is provided at its outer end with a circular flange plate portion to which is bolted or otherwise secured a worm gear 306. This worm gear is adjustably maintained in any suitable position by a worm screw 308 which is rotatably mounted in bearings 310 which may be welded or otherwise secured to the casing 290.

The bevel gear 302 is keyed to a sleeve 311 which is rotatably mounted on the shaft 282 and is keyed to a cam 312 having a high point 314. A lever bar 316 is pivotally secured to the casing 290 by any suitable means, such as, for instance, a hinge 318 and a bar 320. The free end of the lever bar 316 rides on the upper portion of the circumference of the cam 312. This lever arm carries a mercury tube switch 322 having two electrodes 324 and 326 which are shorted when the lever bar is raised by the high point of the cam. These electrodes are connected, as shown in Figure 26. The function of this master switch may best be disclosed after the electrical circuits shown in Figure 26 have been fully described.

It is believed sufficient here to state that by turning the worm screw the angular position of the high point 314 of the cam 312 about the shaft 282 may be changed as desired. This change is made possible by the fact that when the worm gear is rotated by the worm screw that the bevel gear 300 is also rotated. This rotation of the bevel gear 300 moves the pinion 298 about the shaft 252 without rotating the cam 312. If desired, the side of the casing 290 adjacent the worm screw may be marked, cut or indented so that a dial 328 is formed which is concentric with the shaft 252. In this event, the worm gear 308 is preferably provided with an indicator 330 in any suitable manner.

Referring now to Figures 1a, 2b, and Figure 26, it will be noted that the rear part of the upper portion of the frame 2 is provided with a platform 332. Upon this platform is carried a large part of the devices whereby the rear conveyor is driven.

The main power line drive shaft 172 which drives the front conveyor provides the sole means whereby the power is transmitted to the various mechanisms driving the rear conveyor when and only when the rear conveyor is being driven at the same speed as the front conveyor.

During the time the rear conveyor is driven faster than the front conveyor, part of the power is obtained from the main line shaft and additional power is supplied through the motor 248. The power line drive shaft drives through any suitable means, a shaft 334 carrying a bevel gear 336 which is in meshed relation with a bevel gear 338 which is coupled by a shaft 340 to a constant speed drive input shaft 342 of any suitable variable speed transmission 344, having means whereby the R. P. M. of the main drive shaft 346 of a variable speed transmission may be increased by the application of power to the speed control shaft 348.

One type of such a variable speed transmission is shown and described in my application for patent, Serial Number 246,550, for improvements in Variable speed transmission, filed in the United States Patent Office on December 19, 1938, now U. S. Letters Patent No. 2,245,392, dated June 10, 1941.

In the present instance, the speed control shaft 348 is driven by the motor 279 through a speed reducer 281 which is coupled to the speed control shaft 348 by any suitable means, such as, for instance, a shaft 350. The effect of rotating the speed control shaft 348 is to accelerate the R. P. M. of the main drive shaft 346 of the speed transmission 344.

This last mentioned shaft is provided with a spur gear 349 which is in meshed relationship with a gear wheel 351, fixedly secured to a shaft 352. This drives through a chain belt 354 the shaft 214, upon which the idler wheels 213 are rotatably carried. This shaft has a fixedly secured sprocket wheel 356 which drives a chain belt 358. This chain belt drives a sprocket wheel 360 mounted on a shaft 362 and also drives the rear conveyor through a sprocket wheel 364 which is fixedly secured to the rear axle which drives this rear conveyor. An idler sprocket wheel 366 is meshed with the chain belt 358 for the purpose of keeping the sprocket wheel 360 at all times in mesh with two or more links of the chain belt 358. The shaft 362 drives a chain belt 367 which in turn drives a compacting belt 368 through a cog wheel 369.

The compacting belt 368 is carried on sprocket wheels 370 which are mounted on shafts 372 which are rotatably carried on an adjustably supported frame 374. This frame is supported at either end by adjusting screws 376 which pass through brackets 378 secured to frame 2. The screws are provided with adjusting bolts 380 whereby the frame 374 of the compacting conveyor may be raised or lowered according to the thickness of the batts to be manufactured. Also rigidly mounted on the supporting frame 374 is a cylindrical tube 381 (see Figures 16 and 17) which carries a rotatably mounted drum 382. Fixedly mounted on this tube is a plurality of spiders or pulley members 383 carrying a plurality of electrical heat resistor rods 384 which are insulated from the pulleys by any suitable means (not shown). These resistor rods provide a means whereby the rotatably mounted drum may be constantly maintained at a sufficiently high temperature to soften strips of adhesively treated fabric with tar or the like. These resistor rods may be electrically connected substantially as shown in Figure 26. Insulated conductors (not shown) may pass out of the tube 381 through an opening 382' provided in the tube for this purpose.

Any suitable cylindrical rod or roller 385 may be, if desired, rotatably mounted on the supporting frame 374 intermediate of the drum 382 and the compacting belt 368. A plurality of rolls of fabric strips 386 is mounted on an upper portion of the frame 2 in any suitable manner, such as, for instance, by shafts or rods 388 which are prevented from moving forward by brackets 390 secured to the frame 2. One of these fabric rolls 386 is carried directly above each line of advancing bolts. The fabric strips are fed under the roller 385 and around the heated drum 378 which deposits the strips from the batts. These strips are unwound at the same speed as the rear conveyor advances by means of the compacting belt 368 advancing at the same speed as the rear conveyor.

Referring now to Figures 18 to 20, inclusive, the hot wire carrying shaft 224 is provided intermediate of each of its ends and its central portion with a fixedly secured collar of insulating material 392. These collars carry a metal conducting ring 394 each of which is preferably connected to the electrical circuit shown in Figure 26, by any suitable means, such as, for instance, a mercury pool 396. Each of these conducting rings 394 is also electrically connected by means of an inwardly extending conductor 398 to a circular metal conducting band 400 which is carried on the circumference of a fixedly secured collar 402, which may be made of any suitable insulating material, such as Bakelite.

A pair of rotatably mounted and spaced-apart collars 404 is mounted on the shaft 224 intermediate of the collars 402. To these last mentioned collars are welded or otherwise secured a horizontally extending L-shaped beam 406. A vertically extending plate 408 is fixedly secured on one end of the beam 406. This plate is provided with an opening (not shown) through which the hot wire carrying shaft 224 passes in such a manner that this shaft may be freely rotated. The upper portion of the plate (as viewed in Figure 18) is provided with a pair of bearings 410 carrying a rotatable worm screw 412. This worm screw meshes with a worm gear 414 which is fixedly secured to the shaft 224. The worm gear is preferably provided with an opening 416 through which one of the conductors 398 passes from one of the metal plate rings 394 to one of the metal bands 400. This arrangement is provided for the purpose of permitting the L-shaped beam 406 and any elements mounted thereon to be rotated to any desired angular position about the shaft 224 to the end that the strips 386 covering the batts 33 may be separated into sections by burning the strips between the batts 33.

The L-shaped beam 406 is provided with a pair of any suitable clamping means 417 whereby a hot wire carrying frame 418 may be rigidly and preferably detachably secured to the hot wire carrying shaft 224. This frame 418 may be constructed in any form suitable for the purposes intended, but in the form shown it consists of upper and lower horizontally extending U-shaped channel bars 418—a which are welded or otherwise fixedly secured to vertically extending bars 418—b. The lower portion of these vertically extending bars preferably extends below the lower one of the channel bars 418—a for the purpose of receiving two slidably mounted spring pressed rods 419 whereby the tension may be adjusted, on a hereinafter described resistor wire which is provided for the purpose of burning the paper strips in the desired sections. Each of these sections, of course, covers only one of the batts 33.

The clamping means 417 may consist of two pairs of spaced-apart blocks 420 which are rigidly secured to the L-shaped beam substantially as shown. One of each of these pairs of blocks is welded to and above the beam 406 and the other of each pair of blocks is welded to and below this beam. The blocks of each pair and the interposed portion of the beam 406 form metal casings 422 which are each recessed, as shown, to provide a vertically extending cylindrical bore and a horizontally extending cylindrical bore 424. The upper portion of each vertical bore is provided with a circumferential groove 426 which is positioned so as to be in alignment with one of the circumferential recessed portions 428 carried by pins 430 which project from the upper portion of the hot wire carrying frame 418.

A rotatable cam shaft 432 having a crank 435 extends into the casing and into the groove 426 in such a manner that the cam shaft 434 may detachably lock the pins 430 in rigid engagement with the casing 422.

The horizontal bore 424 carries a spring pressed boss 431 which is adapted to detachably hold the pins in the position shown in such a manner that the pins may be easily withdrawn when the cam shaft 434 is in its unlocked position by merely pulling the hot wire carrying frame 418 outwardly from the hot wire carrying shaft 224. Each upper corner of the hot wire carrying frame 418 is provided with a spring pressed brush 437, each of which is insulated from the hot wire carrying frame in any suitable manner, such as, for instance, by Bakelite blocks 438. Each of the brushes 437 is electrically connected to an insulated conductor 440. These conductors pass through openings 441 provided in the upper channel bar and elongated slotted portions 442 provided in the lower channel bar.

The lower end of each of these conductors is secured to a metal block 443. A resistor wire 444 which is adapted to be electrically heated to incandescence has one of its ends secured to each of the metal blocks 443. The wire 444 is, of course, provided for the purpose of burning the cover strips 386 into sections of the desired length. Each of the metal blocks 443 is mounted on an insulating block 446. These blocks are slidably held under tension within and beneath the lower U-shaped channel bar 418—a by the spring pressed rods 419.

These spring pressed rods are slidably mounted in bearings 447 carried in the lower portion of the bars 418—b. The inner end portions of these spring pressed rods are rigidly secured to one of the insulating blocks 446 and the outer end of each of these rods is threadedly adapted to receive a knurled adjusting nut 448 whereby the tension of the fabric burning wire 444 is adjusted by compressing or releasing a spring 449 which encircles each of these rods.

Each of the insulated conductors 440, may, if desired, be helically wound at 449 for the purpose of enabling these conductors to follow the movements of the metal blocks 442, as these blocks are moved inwardly or outwardly beneath the hot wire-carrying frame 418.

It will, of course, be understood that the electrical devices used in my batt making machine may be provided with electrical power from any suitable electrical source, and that this power may be provided through any suitable circuits, such as, for instance, the circuits diagrammatically shown in Figure 26.

In this figure the various electrical devices are shown operatively connected to a three phase power system, indicated in Figure 26 by conductors 451 to 453, inclusive.

The motor 18, driving the saws 24 which slit the advancing blanket strips, is fed by a three wire conductor line 454 which passes through a starter box 456. The motor 279, which intermittently accelerates the rear conveyor, is electrically connected to the conductors 451, 452, and 453, through any suitable three conductors 455 to 457, inclusive, which pass through the starter box 278. This starter box has a solenoid operated plunger (not shown) which closes the circuit of the motor 279 when the two electrodes 272, 274, of the mercury switch 270 are shorted by energizing the solenoid windings through the conductors 276 and 277. These conductors, of course, may be connected to any two of the three conductors leading to the three phase power line. When the circuit leading through these two electrodes is open, the solenoid winding is, of course, de-energized and the circuit of the motor 279 is opened.

The resistor rods 383 within the rotatable drum 382 are preferably connected in parallel with each other and in series with the resistor rod wire 444. These resistor elements are preferably connected as shown in Figure 26 to the power line conductors 458 and 460 which pass through any suitable starter box 466.

The starter box 466 is preferably provided with six pairs of stationary switch contacts 468 to 473, inclusive. The first three mentioned of these pairs of stationary contacts 468, 469, and 470 are respectively provided with movable jumper bars 468', 469' and 470', and the circuits through these contacts are opened and closed by a plunger, not shown, which is operated by a solenoid 474. The last three mentioned pairs of these stationary contacts 471, 472, and 473 are respectively provided with jumper bars 471', 472', and 473'. The circuits using these contacts are opened and closed by a plunger, not shown, which is operated by a solenoid 475.

The solenoids 471, 475 are connected in series with each other, and at their inner terminals (as viewed in Figure 26) are permanently connected to the conductor 460, which is directly connected to the power line conductor 450.

The outer end of the solenoid 475 is connected by a conductor 476 to the electrode 69 of the four electrode mercury switch tube 67. The outer end of the solenoid 474 is connected by a conductor 477 to the electrode 71 of said switch tube. The inner electrodes 68 and 70 of the four electrode switch tube are each connected to a common conductor 478 which is connected to the outlet side of the stationary ontacts 431'. The electrode 324 of the two-electrode master switch tube 321 is connected to the conductor 478 and the other electrode 326 of this tube is connected by a conductor 480 to the conductor 462. The conductors 460, 462, and 464, are connected as follows: the conductor 460 to the input side of the pair of contacts 470 and 471; the conductor 462 to the input side of the pair of contacts 469 and 473; and the conductor 464 to the input side of the pair of contacts 468 and 472. The motors 38 and 158 are connected in parallel with each other by conductors 482, 484, and 486. The conductor 482 leads to the output side of the stationary contacts 468 and 471; the conductor 484 leads to the output side of the pair of contacts 469 and 473, and the conductor 486 leads to the output side of the stationary contacts 470 and 472.

For the purpose of clarification, none of the magnetic brakes employed is indicated in Figure 26, but it will, of course, be understood that each and every motor which should preferably be brought to a sudden stop may be provided with such a brake.

In operation, the drive shaft 182 preferably drives both the front and the rear conveyor at the same speed except when the batts 33 are to be covered with one or more longitudinally extending marginal portions, such as, for instance, the marginal portions 486 shown in Figure 25.

The application of the marginal side portions 488, of course, does not require that the batts be separated from each other, as these marginal portions are folded back on the rolled strips 386 before these strips are placed in position on the upper portion of the frame 2.

The motor 279 is adapted to rotate at a constant speed. Therefore, when the batts are to be separated from each other, the rear conveyor merely is speeded up by running this motor for the interval of time necessary to space the batts at the desired distance from each other. The windings of the motor 279 are energized by closing of the mercury switch tube 270. This motor drives the speed control shaft of the speed transmission at a constant speed and thereby increases the speed of its main drive shaft 346 to a known number of R. P. M. This main drive shaft drives the rear conveyor.

As the blanket advances, it is slitted by the saws 24 into a plurality of strips which are then cut transversely by the advancing and traversing saw 160. As this saw reaches the limit of its travel in either direction, the mercury in the tube 67 is moved from one pair of its electrodes before the mercury shorts the other pair of electrodes. At this instant the circuits of both solenoids are open and immediately thereafter none of the stationary contacts 468 to 473, inclusive, are shorted by their jumper bars for the reason that all of these jumper bars are held in their closed position solely by the magnetic actions of one or the other of these solenoids. Under these conditions, both of the solenoids must remain de-energized and all the jumper bars remain in their open position until the high point 314 of the master switch cam tilts the master switch tube in such a manner as to short its electrodes 324 and 326. As these electrodes are shorted, the current passes through the lower pair of the electrodes of the mercury tube 67, thereby energizing the solenoid electrically connected to these electrodes. This, of course, closes the circuits making use of the jumper bars which were in their open position before the first mentioned tilting of the mercury tube 67.

By referring to the diagram of the starter box 466, it will be seen that the electrical connections to the motor 38 and the motor 158 are now changed in such a manner as to reverse the rotation of the shafts of these motors.

It is also obvious that the solenoid winding 97 lifts its plunger 98 and opens the air valve 86 at all times the motors 38 and 158 are energized. The opening of the air valve introduces compressed air into the pneumatically operated device 81, thereby forcing its rubber diaphragm inwardly and locking the disc and cog wheel member in engagement with the chain 76, thus, of course, advancing the saw 160 as it saws the advancing strips into the batts 33.

The distance the batts are to be spaced apart from each other on the rear conveyor is dependent upon the length of the longitudinally extending marginal portion or portions of the strips covering each batt.

Let us now assume that only one longitudinally extending marginal portion of two inches is to be provided with each covered batt. Now, the distance the motor 279 increases the movement of the rear conveyor for any period of time is known, and this period of time is provided by properly adjusting the cam disc 254 and 256 so that the raised portion of these cams raise the lever 260 upwardly and thereby close the circuit leading to the motor 279.

The length of the batts is determined by the R. P. M. of the cam 312 which tilts the master switch 321 and shorts its electrodes. The R. P. M. of this cam may, of course, be adjusted as desired by using the proper ratios between the gears 216 and 218 and the sprocket wheels driving the shaft 282 of the master switch means.

In order to cut the paper strips at the exact position desired it is usually necessary to adjust the angular position of the hot wire carrying frame 418 about its shaft 224 by turning the worm screw 412.

Certain other previously indicated adjustments are, of course, made when necessary, but the above description of the elements and the method of operation of my batt making machine are thought to adequately disclose my invention to those skilled in the art.

It is, of course, understood that various modifications of this preferred form of my invention may be made without departing from the scope of my invention, and it is also apparent that my machine is equally dependable for cutting strips of any material adapted to be advanced on a conveyor sawn or cut into batts or blocks.

It will also be understood that the front and the rear conveyors may be separately used to perform their different functions and that one or more conveyors moving at the same speed as the front conveyor may be positioned between the front and the rear conveyors for the purpose of adhesively or otherwise treating the batts before the paper strips are applied.

I claim:

1. The herein described method of producing a plurality of mineral wool batts from an elongated continuously moving blanket of newly shredded and adhesively treated mineral wool fibers deposited within a heated zone to form said blanket, said method comprising continuously withdrawing said blanket in a heated condition from said zone, conveying said blanket in a single direction at one speed, slitting said moving blanket longitudinally into a strip having a predetermined width, intermittently slitting said strip transversely at predetermined intervals into rectangular batts of a predetermined length while moving said batts at said speed, thereafter intermittently conveying said batts first at said speed and then at a speed higher than said first mentioned speed to space apart said batts at predetermined distances from each other, adhesively applying an elongated sheet to each batt of said batts before said batt is accelerated and spaced apart from the next following batt and separating said adhered sheet transversely between said batts at predetermined lengths into a plurality of sheet sections secured to said batts.

2. The herein described method of producing a plurality of mineral wool batts from an elongated continuously moving blanket of newly shredded and adhesively treated mineral wool fibers deposited within a heated zone to form said blanket, said method comprising continuously withdrawing said blanket in a heated condition from said zone, conveying said blanket in a single direction at one speed, slitting said moving blanket longitudinally into a strip having a predetermined width, intermittently slitting said strip transversely at predetermined intervals into rectangular batts, having a predetermined length while moving said batts at said speed, thereafter intermittently conveying said batts first at said speed and then at a speed higher than said first mentioned speed to space apart said batts at predetermined distances from each other; adhesively applying an elongated sheet adhesively coated on one side to each batt of said batts before said batt is accelerated and spaced apart from the next following batt and separating said adhered sheet transversely between said batts at predetermined lengths into a plurality of sheet sections secured to said batts.

3. The herein described method of producing a plurality of mineral wool batts from an elongated continuously moving blanket of newly shredded and adhesively treated mineral wool fibers deposited within a heated zone to form said blanket, said method comprising continuously withdrawing said blanket in a heated condition from said zone, conveying said blanket in a single direction at one speed, slitting said moving blanket longitudinally into a strip having a predetermined width, intermittently slitting said strip transversely at predetermined intervals into rectangular batts of a predetermined length and width while moving said batts at said speed; thereafter intermittently conveying said batts first at said speed and then at a speed higher than said first mentioned speed to space apart said batts at predetermined distances from each other, applying an elongated heated adhesively coated sheet to each batt of said batts before said batt is accelerated and spaced apart from the next following batt and separating the applied sheet transversely at predetermined lengths into a plurality of sheet sections of predetermined length attached to said batts, the adhesive on said adhesively coated sheet including a thermoplastic adapted to be softened by heating.

4. The herein described method of producing a plurality of mineral wool batts from an elongated continuously moving blanket of newly shredded and adhesively treated mineral wool fibers deposited within a heated zone to form said blanket, said method comprising continuously withdrawing said blanket in a heated condition from said zone, conveying said blanket into a single direction at one speed, slitting said moving blanket longitudinally into a strip having a predetermined width, intermittently slitting said strip transversely at predetermined intervals into rectangular batts of determined length and width while conveying said batts at said speed, thereafter intermittently conveying said batts first at said speed and then at a speed higher than said first mentioned speed in a manner adapted to space apart said batts at predetermined distances from each other; applying an elongated marginally folded sheet of covering materials wider than said batts to each batt of said batts before said batt is accelerated and spaced apart from the next following batt and separating said sheet transversely at predetermined lengths longer than said batts into a plurality of sheet sections of predetermined dimensions.

5. The herein described method of producing a plurality of mineral wool batts from an elongated continuously moving blanket of newly shredded and adhesively treated mineral wool fibers deposited within a heated zone to form said blanket, said method comprising continuously withdrawing said blanket in a heated condition from said zone, conveying said blanket into a single direction at one speed, slitting said moving blanket longitudinally into a strip having a predetermined width, intermittently slitting said strip transversely at predetermined intervals into rectangular batts of a predetermined length and width while moving said batts at said speed, thereafter intermittently conveying said batts first at said speed and then at a speed higher than said first mentioned speed to space apart said batts at predetermined distances from each other, applying an elongated sheet of adhesively treated coating materials to each batt of said batts before said batt is accelerated and spaced apart from the next following batt and thereafter burning said sheet into a plurality of sections each of which is adhesively secured to one of said batts.

6. The herein described method of producing a plurality of mineral wool batts from an elongated continuously moving blanket of newly shredded and adhesively treated mineral wool fibers deposited within a heated zone to form said blanket, said method comprising continuously withdrawing said blanket in a heated condition from said zone, conveying said blanket in a single direction at one speed, slitting said moving blanket longitudinally into a strip having a predetermined width, intermittently, rotatably, and transversely slitting said strip at predetermined intervals into rectangular batts of predetermined width and, with respect to said direction, with an oblique motion advancing with said strip at said speed and moving through said strip in a manner adapted to cut said strips at right angles to said direction; adhesively applying an elongated marginally folded sheet of covering material wider than said batts to each batt of said batts before said batt is accelerated and spaced apart from the next following batt and separating said sheet transversely substantially midway between at predetermined lengths into a plurality of sheet sections having predetermined dimensions, the adhesive on said adhesively coated sheet including a thermo-plastic adapted to be softened by heating and said adhesive being preheated immediately before application to said batts.

DANIEL C. DRILL.